US008812653B2

(12) United States Patent
Chandrasekaran (10) Patent No.: US 8,812,653 B2
(45) Date of Patent: Aug. 19, 2014

(54) AUTONOMOUS INTELLIGENT WORKLOAD MANAGEMENT

(75) Inventor: Karthik Chandrasekaran, Bangalore (IN)

(73) Assignee: Novell, Inc., Provo, UT (US)

( * ) Notice: Subject to any disclaimer, the term of this patent is extended or adjusted under 35 U.S.C. 154(b) by 770 days.

(21) Appl. No.: 12/851,372

(22) Filed: Aug. 5, 2010

(65) Prior Publication Data

US 2012/0036249 A1 Feb. 9, 2012

(51) Int. Cl.
*G06F 15/173* (2006.01)

(52) U.S. Cl.
USPC .......................................... 709/224; 709/217

(58) Field of Classification Search
USPC ................................................. 709/220–226
See application file for complete search history.

(56) References Cited

U.S. PATENT DOCUMENTS

| | | | | |
|---|---|---|---|---|
| 7,191,329 B2* | 3/2007 | Murphy | ........................ | 713/100 |
| 7,509,418 B2* | 3/2009 | Yan et al. | ...................... | 709/225 |
| 7,660,897 B2* | 2/2010 | Hall et al. | ..................... | 709/226 |
| 7,702,784 B2* | 4/2010 | Berstis et al. | ................ | 709/224 |
| 2005/0165925 A1* | 7/2005 | Dan et al. | ...................... | 709/224 |
| 2005/0278439 A1* | 12/2005 | Cherkasova | .................. | 709/223 |
| 2006/0020394 A1* | 1/2006 | Dicke et al. | ..................... | 702/19 |
| 2006/0184470 A1* | 8/2006 | Zhu | ................................. | 706/16 |
| 2007/0260668 A1* | 11/2007 | Chen et al. | .................... | 709/201 |
| 2008/0177880 A1* | 7/2008 | Ginis | ............................ | 709/226 |
| 2008/0244584 A1 | 10/2008 | Smith et al. | | |
| 2009/0070721 A1 | 3/2009 | Solomon | | |
| 2009/0259769 A1 | 10/2009 | Lakshmanan et al. | | |
| 2010/0070054 A1 | 3/2010 | Solomon | | |
| 2011/0270853 A1* | 11/2011 | Curbera et al. | ............... | 707/755 |

OTHER PUBLICATIONS

Gaurav. Khanna, et al., "A Hypergraph Partitioning Based Approach for Scheduling of Tasks with Batch-shared I/O" (2005).*
Chialin Chang, et al., "A Hypergraph_Based Workload Partitioning Strategy for Parallel Data Aggregation" (Dec. 2000).*
Siriluck et, al., "An Ant Colony Optimization for Dynamic Job Scheduling in Grid Environment" (Aug. 2007).*
Banerjee, Soumya, et al., "Cloud Computing Initiative using Modified Ant Colony Framework", World Academy of Science, Engineering and Technology, vol. 56, (2009), 221-224.
Deng, Yuhui, et al., "Ant colony optimization inspired resource discovery in P2P Grid systems", The Journal of Supercomputing, 49(1), (Jul. 2009), 4-21.

* cited by examiner

*Primary Examiner* — Yasin Barqadle
(74) *Attorney, Agent, or Firm* — Schwegman, Lundberg & Woessner, P.A.

(57) ABSTRACT

Apparatus, systems, and methods may operate to create a hypergraph of weighted vertices comprising computing resources and storage resources, and nets comprising workloads; to receive a plurality of requests to be addressed by a network associated with the hypergraph, at least some of the requests associated with data objects; to calculate partition schemes for the network based on the requests and the data objects according to an ant colony optimization heuristic; and to autonomously reallocate the workloads to the computing resources and/or the storage resources according to the partition schemes. The workloads may act as ants following a path defined by the vertices of the hypergraph. Further activities may thus include depositing pheromones along hyperedges of the hypergraph, wherein the hyperedges are used for swapping the vertices between the workloads. Additional apparatus, systems, and methods are disclosed.

20 Claims, 4 Drawing Sheets

AUTONOMOUS INTELLIGENT WORKLOAD MANAGEMENT

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example code and/or pseudo-code described below, and in any drawings appended hereto: Copyright 2010 Novell, Inc. of Waltham, Mass.—All Rights Reserved.

BACKGROUND

As computing networks increase in size, the number and distribution of available resources (e.g., computing and storage resources) becomes more varied. While network growth can provide an improvement in processing power, it can also make the efficient assignment of workloads to resources more difficult. Algorithms have been devised to allocate workloads within a network, but these usually operate in a static, rather than dynamic fashion, so that adjustments based on real-time workload variations are poorly implemented, if they are implemented at all.

SUMMARY

In various embodiments, apparatus, systems, and methods that support autonomous intelligent workload management are provided. For example, in some embodiments, autonomous intelligent workload management is implemented by creating a hypergraph of weighted vertices comprising computing resources and storage resources, with nets comprising workloads. Activities include receiving a plurality of requests (having a request type) to be addressed by the network associated with the hypergraph, at least some of the requests being associated with data objects; and calculating partition schemes for the network based on the requests and the data objects according to an ant colony optimization heuristic. Workloads may be autonomously reallocated to the computing and/or storage resources according to the partition schemes.

In many embodiments, the workloads may act as ants following a path defined by the vertices of the hypergraph. Further activities may thus include depositing pheromones along hyperedges of the hypergraph, wherein the hyperedges are used for swapping the vertices between the workloads. Additional embodiments are described, and along with the foregoing examples, will be set forth in detail below.

DETAILED DESCRIPTION

Intelligent workload management enables information technology (IT) organizations to manage computing resources in a policy-driven, secure, and compliant manner across physical, virtual, and cloud environments to deliver business services to end users. Workloads may comprise integrated stacks of applications, middleware, and operating systems.

An intelligent workload is policy-driven. It understands its own security protocols and processing requirements so that deployment over the public cloud, the private cloud, and/or physical machines can be self-determined. An intelligent workload can also be performance-optimized, to recognize when it is operating at capacity, and to find additional computing resources to meet spikes in demand.

In various embodiments, autonomous intelligent workload management can be implemented using a graph-based model to represent data processing requests (e.g., from end-users, such as customers) and resources, such as computing power and storage. A heuristic based on Ant Colony Optimization (ACO) is presented for allocating the resources to processing the requests. The heuristic can operate to reallocate resources dynamically, processing new incoming requests in substantially real-time based on changes in the current workloads.

In various embodiments then, Intelligent Workload Management (IWM) is modeled as a hypergraph partition problem. A hypergraph is a generalization of a graph, with edges used to connect vertices. While many edges in the graph comprise pairs of vertices, hyperedges comprise arbitrary numbers of vertices.

In many embodiments, vertices and edges can be weighted. The graph partitioning problem then constitutes dividing a graph G into k disjoint parts, such that the parts have approximately equal weight, and the size of the edge cuts is minimized. The size of a cut is the sum of the weights of the edges contained in it, while the weight of a part is the sum of the weights of the vertices in the part (e.g., a hyperedge).

A common extension of this problem is the hypergraph partition problem, where an edge is used to connect more than two vertices. A hyperedge is not cut if all vertices are in one partition. Otherise, it is cut exactly once, no matter how many vertices are on each side.

Graph partitioning is known to be of the computational complexity class which is nondeterministic polynomial (NP)-complete. NP-complete problems are a subset of NP problems: the set of all decision problems whose solutions can be verified in polynomial time. Thus, NP-complete problems may be equivalently defined as the set of decision problems that can be solved in polynomial time on a nondeterministic Turing machine.

Each resource, whether it is a computing resource or a storage resource, can be modeled as a vertex in the hypergraph, and each workload can be modeled as a net that connects some number of the vertices. Thus, the term "net" can be used interchangeably with the phrase "a set of vertices". A link between a net and a vertex signifies whether computing and/or storage is used from the vertex resources.

Thus a hypergraph $H=(V, N)$ is defined with V as the set of vertices, and N as the set of nets. The weight $w_i$ of vertex $v_i$ is the expected workload, and the weight $s_i$ of a vertex $v_i$ is the size of the data to be consumed or generated. The cost $c_j$ of a net $n_j$ is the expected data access caused by the workload, which is calculated as the expected number of requests of a particular type, multiplied by the sum of the neighboring data object size.

The K-way hypergraph partition problem comprises assigning all vertices to K disjoint nonempty locations, with capacities to accommodate the expected workloads and achieve minimal partition cost. This problem can be solved using a mechanism that provides partition decisions prompted by requests to process data objects with reduced cross-location data communication overhead.

The initial graph of resources can then be split into k disjoint parts which correspond to the K-way hypergraph partition of the graph. For example, if k=2, the two disjoint parts would correspond to a bijection of the graph.

Thus, many embodiments of the invention may be realized, and each can be implemented in a variety of architectural platforms, along with various operating and server systems, devices, and applications. Any particular architectural layout or implementation presented herein is therefore provided for purposes of illustration and comprehension only, and is not intended to limit the various embodiments.

Figure 1:
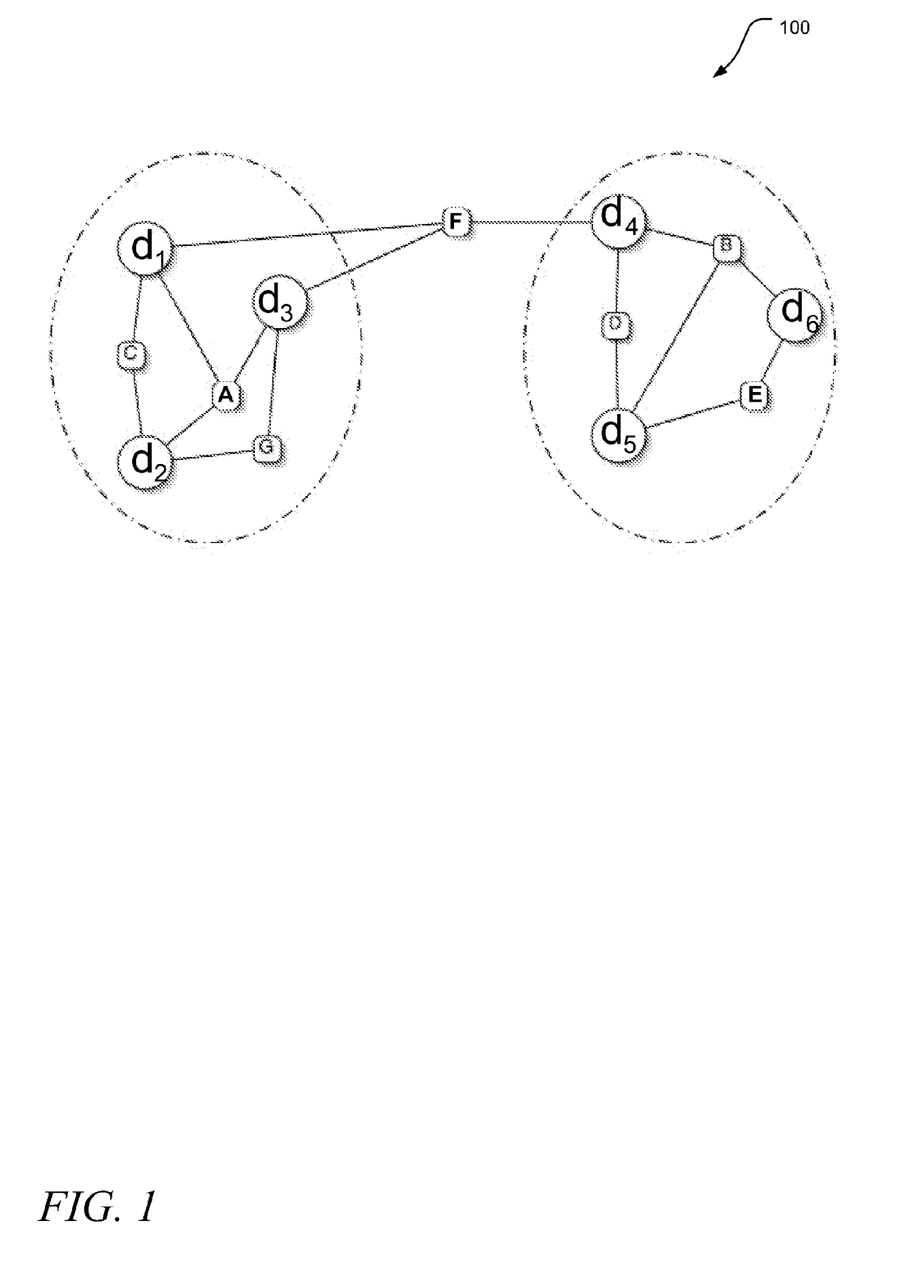
FIG. 1 illustrates a partitioned hypergraph according to various embodiments of the invention.

FIG. 1 illustrates a partitioned hypergraph 100 according to various embodiments of the invention. Here d1, d2, ..., d5, d6 correspond to the vertices of the hypergraph 100. Edges connect pairs of the vertices d1, d2, ..., d5, d6, such as the edge C connecting the pair of vertices d1 and d2, and the edges D and E connecting the pairs of vertices d4, d5 and d5, d6, respectively. The net A comprises a hyperedge connecting vertices d1, d2, and d3. The net B comprises a hyperedge connecting vertices d4, d5, and d6. The link F connects the nets A and B.

To solve the graph partition problem, several algorithms have been proposed in the literature, including the Kernighan-Lin algorithm. This heuristic algorithm suffers in the same way as others of its type—it is not meant to be used in a dynamic environment, failing to produce solutions when the graphs are modified. However, when the problem of IWM is considered, it is understood that the corresponding graphs can be modified continuously, since additional workloads can appear at any time, so that spikes in the volume of incoming requests can overwhelm the capacity of the assigned resources. Moving workloads may result in more efficient utilization under such conditions, but conventional reallocation algorithms do not indicate how movement should be accomplished. In many of the embodiments described herein, an algorithm derived from an ACO heuristic is used to solve this particular hypergraph partitioning problem.

ACO provides a probabilistic technique for solving computational problems which can be reduced to finding paths through graphs. The heuristic is based on the behavior of ants seeking an efficient path from their colony to a source of food. In the real world, ants (initially) wander randomly until they find food. Once the food is located, the ants return to their colony while laying down pheromone trails. When other ants find the path that has been marked with pheromones, they are more likely to follow the same trail, rather than to continue their random exploration. In addition, these ants will tend to return and reinforce the same trail if they also end up finding food.

Over time, however, the pheromone trail begins to evaporate, reducing its attractive strength. The more time it takes for an ant to travel down the path and back again, the more time the pheromones have to evaporate. A short path, by comparison, supports faster travel, so the pheromone density remains high, being laid on the path faster than it evaporates.

The phenomenon of pheromone evaporation thus has the advantage of avoiding convergence to a locally-optimal solution. If there were no evaporation, paths chosen by the first ants to find food would be excessively attractive to the ants that follow. In that case, exploration of the solution space would be constrained.

Evaporation allows for the possibility of one or more ants finding a better (e.g., shorter) path from the colony to a food source, such that other ants are more likely to follow that path, so that positive feedback eventually leads many ants to follow a single, shorter path. The idea of the ACO-derived heuristic described herein is to mimic this behavior with simulated "ants" traveling between vertices of the graph (e.g., along the nets of the graph) that represents the resource allocation problem to be solved.

The following represents a problem statement to be solved by an algorithm for workload management based on the concept of an ACO heuristic:

Given the following input:
   requests ($r1, r2, \ldots, r_M$);
   data objects ($d1, d2, \ldots, d_N$); and
   request-data relationship types ($t1=(di, dj, \ldots )$, $t2=(dx, dy, \ldots )$, $t_R$), where each request belongs to one of R request types.

The following output:
   the request partition schemes (R1, R2, ..., RK) and the data partition schemes (D1, D2, ..., DK) for K locations.

And the problem statement:
   provide an automated mechanism that determines request and data partitions, reducing cross-location data communication overhead.

The following solution may be implemented:
   minimize the cut size (i.e., the number of edges between partitions of the graph) as follows:

cut size=$\Sigma_{tj \in N\text{-}cut}(C(tj))$, subject to $W^t(V_k) \leq (1+\text{epsilon}(t))^* C^t_k$ for k=1, 2, ... K and t=1,2; where tj=request of type j, c(tj)=the number of requests of type j, $W^t(V_k)$=the sum of the vertex weights at location k, and $C^t_k$=the location j capacity of resource type t (for t=1:storage, t=2:computing). Epsilon(t)=a very small value (e.g., approximately 0.01 or 0.001) compared to 1.0, which allows the weights of the vertices to vary within a defined window so that optimization can proceed more efficiently. The request type characterizes a subset of all possible requests, and can thus serve as a basis for partitioning the graph.

An example of this problem might applied to a particular set of circumstances might include a video-on-demand application. Requests in this case might comprise requests for video clips or movie files that are generated by various customers. Data objects could be the formats of the video data requested (e.g., *.mpg (MPEG video file) or *.wmv (Windows® media video file)). Here, the request types might comprise a subset of the available video files relating to a particular topic, such as the latest election news-related video clips, or video clips recording a recent environmental occurrence, such as a volcano eruption. Data partitioning schemes could comprise distributing the requested video files across multiple, geographically diverse network locations (modeled as vertices). Request partition schemes could involve directing the requests for video files from the customers to the various geographic locations where the video files are distributed.

To continue the example, one may assume that the video files are distributed across two locations: A and B. Further assume that there are three servers in location A, namely a1, a2, a3; and two servers in location B, namely b1 and b2. Also assume that servers a1, a2, a3 are connected by a first network (e.g., a first hyperedge), and that servers b1, b2 are connected by a second network (e.g., a second hyperedge). Each network is connected to the other by a network bridge (e.g., a link). The internal cost in this case would be the network traffic within a1, a2, a3; while the external cost would be the network traffic across the bridge connecting the locations A and B.

The number of partitions can be decided based on the number of geographical locations over which the resources and the workloads are to be distributed. For example, in the case of providing video-on-demand, with distribution between six cities located in the United States and Europe, the number of partitions would be six, for the six vertices of the corresponding hypergraph.

To address the problem statement set forth above, the following algorithm for workload management based on an ACO heuristic via k-way partitioning of the workload hypergraph may be used:

//ACO_Workload_Management_Algorithm_Begin//
1. Obtain a random initial assignment of the workloads to the k locations, without minimizing the cross-location data communication overhead, such that certain weight constraints are satisfied (i.e. subject to $W^t(V_k) \leq (1+\text{epsilon}(t))^* C_k$ for k=1, 2, ... K and t=1,2).
2. Represent each workload as an ant. Each ant satisfies the specified weight constraints as it moves around the k locations.
3. During each iteration of the algorithm, each ant may swap locations with another ant in one of the remaining k−1 locations. Ants a and b have a greater probability of choosing to swap their locations when the metric T=Da+Db−2*Ca,b is high, where Da=Ea−Ia and Db=Eb−Ib. Here, Ea and Eb are the external costs of a and b, and Ia and Ib are the internal costs of a and b. Ca,b is the cost of the hyperedge between a and b, provided the hyperedge exists, since all of the vertices in the graph may not be connected (e.g., the graph may be incomplete).
4. The more intense the pheromone trail laid out on a hyperedge between two locations, the lower the probability that the hyperedge will be chosen by an ant for swapping with another ant included in the same hyperedge.
5. After swapping for a given iteration is complete, the ants deposit additional pheromones on all hyperedges used for swapping, when the sum of the T metrics for all ants that have swapped their locations is large.
6. After each iteration, previously-deposited trails of pheromone evaporate.
7. The algorithm ends when a stable solution is reached, which is usually when the ants are no longer able to swap locations to maximize the T metrics.

//ACO_Workload_Management_Algorithm_End//

The ACO_Workload_Management algorithm is used for hypergraphs spanning k locations, based on the ACO heuristic. To understand how this occurs, consider an initial balanced partition of the vertices for two sets of networks: A and B. The algorithm starts with an initial assignment of the ants (as workloads) to k locations, such that the weight constraints for the locations are satisfied. Restrictions on the initial workload assignment are loosened due to the epsilon factor that makes up part of the weighting constraints.

As the algorithm iterates, the ants move so that the weight constraints imposed are always satisfied. This ensures that the final solution obtained from the algorithm also satisfies the constraints. Over each iteration, the algorithm marks a pair of vertices from sets A and B if the metric T=Da+Db−2*Ca,b is maximal. Da denotes the difference between the external and internal costs of the vertex a. The external cost is the sum of the weights of all the edges that start from vertex a (from set A) and that end up in a vertex belonging to set B. The internal cost is the sum of the weights of all the edges that start from vertex a and that belong to the same set A.

The difference between Da and Db is chosen as the criteria to maximize for swapping because once vertices a and b swap their sets (e.g., networks), the external cost of vertex a (for example) becomes its internal cost, and the internal cost of vertex a becomes its external cost. Hence, a reduction in the weight of the edges crossing between the sets A and B is achieved.

The same maximizing criteria that satisfies the weight constraints is also used to reduce the T metric among vertex pairs, by the expedient of the ants choosing to swap locations when the maximizing criteria T=Da+Db−2*Ca,b is large. After the vertices have been marked for swapping based on the maximizing criteria, the sum of the maximizing metric for all subsets of the vertices marked for swapping are calculated. Whichever subset of vertices has the maximum value, those vertices are swapped.

To emulate this process, the ants deposit more pheromones if the sum of the T metrics of the ants that have swapped their locations is large. In this case, the sum of the T metric (see variable $L_k$ in equation [3] below) is large in proportion to individual values that make up the T metric, and the amount of pheromone deposited (see variable $\Delta\tau_{i,j}$ in equation [3] below) is proportional to the sum of the T metric. As a result, ants have a lower probability of choosing a hyperedge for swapping if the pheromone deposit on their own hyperedge is greater than that on another hyperedge. In this way, the algorithm operates to reduce the possibility that swaps which have been made previously are not reversed.

In the algorithm, ant movement occurs according to the update of pheromone deposits. Thus, the movement of an individual ant from vertex i to vertex j may occur according to the probability:

$$p_{i,j} = \frac{(\tau^\alpha_{i,j})(\eta^\beta_{i,j})}{\Sigma(\tau^\alpha_{i,j})(\eta^\beta_{i,j})} \quad [1]$$

where $\tau_{i,j}$ is the amount of pheromone on edge i,j; $\alpha$ is the parameter that controls the influence of $\tau_{i,j}$; $\eta_{i,j}$ is the desirability of edge i,j (typically obtained via a priori knowledge, perhaps approximately equal to $1/d_{i,j}$, where d is the distance along the edge); and $\beta$ is a parameter that controls the influence of $\eta_{i,j}$.

Pheromone deposits can be updated according to the formula:

$$\tau_{i,j}(\text{updated}) = (1-\rho)\tau_{i,j}(\text{previous}) + \Delta\tau_{i,j} \quad [2]$$

where $\tau_{i,j}$ is the amount of pheromone on a given edge i,j; $\rho$ is the rate of pheromone evaporation; and $\Delta\tau_{i,j}$ is the amount of pheromone deposited, typically given by:

$$\Delta\tau_{i,j} = \begin{cases} 1/L_k & \text{if ant } k \text{ travels on edge } i, j \\ 0 & \text{otherwise} \end{cases} \quad [3]$$

where $L_k$ is the cost of the sum of the maximal criteria T for the $k^{th}$ iteration of the algorithm. By maximizing the T metric in each iteration of the algorithm, the external cost (e.g., network connectivity cost across partitions/geographical locations) is reduced. Since the T metric is equivalent to external cost minus internal cost, each time the algorithm runs, ants on vertices a and b (for example) are swapped to maximize the T metric, reducing the external cost. The algorithm ceases to iterate when the T metric can no longer be maximized, such that the external cost cannot be reduced further.

Thus, during each iteration of the algorithm, there are usually several ants from the various partitions which can swap their positions within and between the partitions. Consider the following example.

Assume that two partitions exist: A and B. Partition A has three ants a1, a2, a3; and partition B has three ants b1, b2, b3. This makes for a total of six ants (workloads).

During each iteration, the T metric for each pair of ants is considered. Therefore, the T metrics for the first iteration are as follows (the T metric values shown here have been chosen arbitrarily for the sake of brevity):

$T(a1,b1)=10, T(a1,b2)=9, T(a1,b3)=8, T(a2,b1)=7, T(a2,b2)=6, T(a2,b3)=5, T(a3,b1)=4, T(a3,b2)=3,$ and $T(a3,b3)=2.$ Now, during the first iteration, an attempt is made to maximize the value of the T metric among all the pairs of ants/workloads. In this example, the metric $T(a1, b1)=10$ has the maximum value among all possible pairs. The algorithm then operates to swap ants/workloads a1 and b1 between their original partitions (so that a1 moves from A and B, and b1 moves from B to A, respectively).

For the second iteration, the T metrics are now:

$T(a1,b1)=3, T(a1,b2)=4, T(a1,b3)=5, T(a2,b1)=2, T(a2,b2)=4, T(a2,b3)=2, T(a3,b1)=1, T(a3,b2)=2,$ and $T(a3,b3)=3.$ Now the metric $T(a1, b3)=5$ has the maximum value among all possible pairs. Thus, the algorithm operates to swap the ants/workloads a1 and b3 between the partitions A and B so that now b3 is in partition A, and a1 is in partition B.

For the third iteration, the T metrics are now:

$T(a1,b1)=0, T(a1,b2)=0, T(a1,b3)=0, T(a2,b1)=0, T(a2,b2)=0, T(a2,b3)=0, T(a3,b1)=0, T(a3,b2)=0,$ and $T(a3,b3)=0.$ At this time, all of the T metrics have taken the value of zero, so that none of the T metrics has a maximum value. Thus, further swapping will not provide any improvement, and an optimal solution has been reached. The algorithm ceases to operate because the assignment of the ants/workloads after all three iterations has lead to the optimal assignment of the workloads to the partitions.

In summary, the T metric corresponds to the difference in the external costs and the internal costs of all the vertices in location A. In many cases, the costs are equivalent to the network loading in the connecting network link between two workstations, since the algorithm may be used to reduce network traffic. Thus, the average network load in the various edges in the links connecting the workstations can be scaled down to appropriate values (e.g., initial values of alpha beta, eta, and rho) for use within the T metric calculations.

For example, the external costs can be the network traffic between two separate locations A and B, and the internal cost can be the network traffic within a location (either A or B). The parameter alpha can have some value between 0 and 1, to control the influence of the pheromone deposits $\tau_{i,j}$. Similarly, the parameter beta can have a value between 0 and 1, to control the influence of $\eta_{i,j}$ (the desirability of edge i,j), which in turn may comprise the inverse of the value representing the average network traffic between workstations i and j. Rho, the rate of pheromone evaporation, can also have a value between 0 and 1. In summary, the values of alpha, beta and rho can be arrived at after a small amount of experimentation, with little or no affect on the result of the algorithm, other than the time it may take to execute.

One of the advantages of the algorithm described herein is that workloads can move autonomously, and dynamically. Thus, even when a workload is introduced that violates a weighting constraint, perhaps dues to changes in resource availability, the algorithm can operate to inform and to move the workload to a location where the constraint is satisfied. Thus, whenever an ant/workload cannot be accommodated in a particular location because of resource constraints, that ant/workload can operate to initiate the algorithm and thus respond dynamically to the increase in resource demand. In this way, each ant/workload can move to a useful location (e.g., one that does not violate resource constraints) in a self-determined manner. Additional embodiments may be realized.

Figure 2:
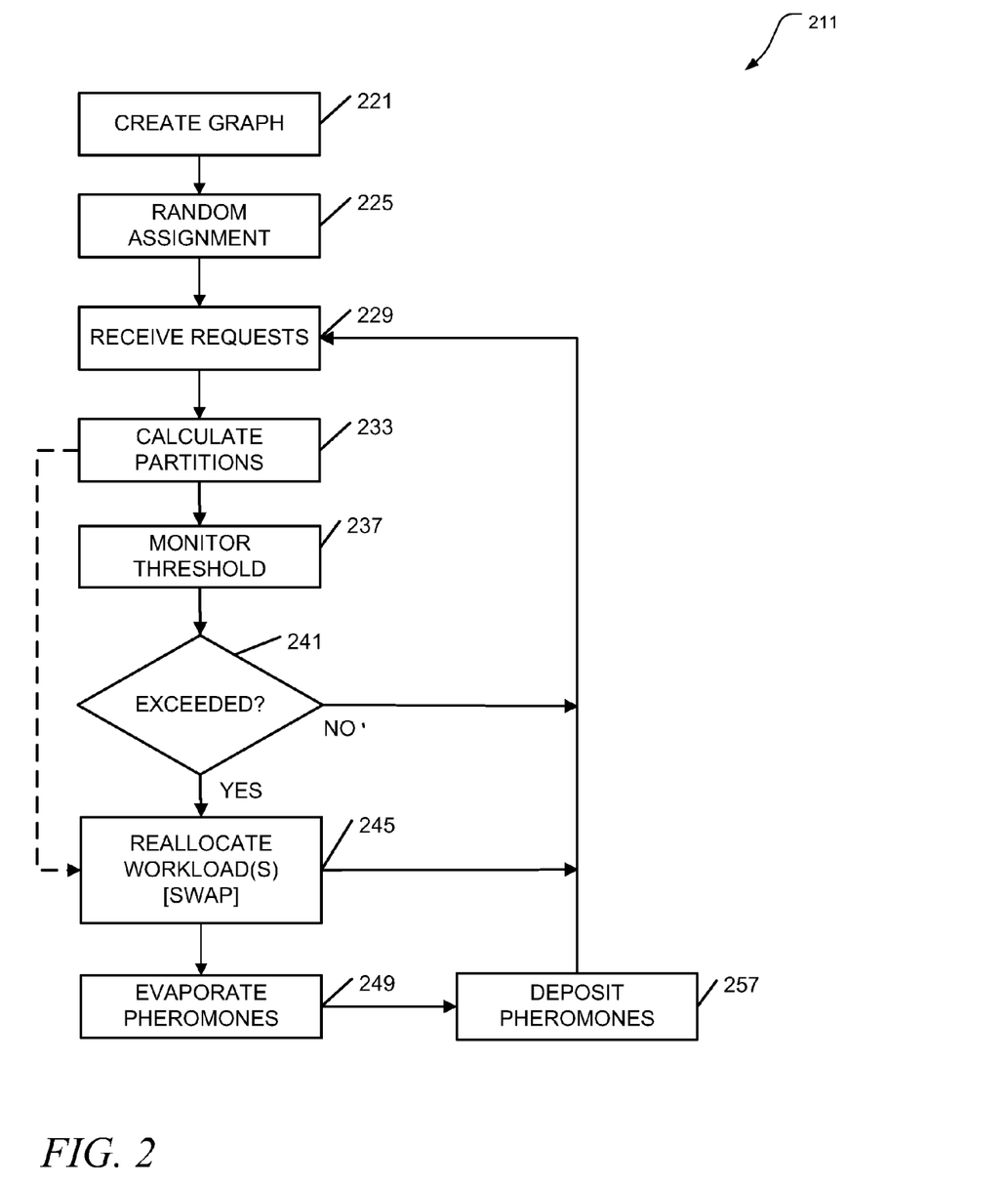
FIG. 2 is a flow diagram illustrating methods of implementing autonomous intelligent workload management according to various embodiments of the invention.

For example, FIG. 2 is a flow diagram illustrating methods 211 of implementing autonomous intelligent workload management according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when accessed by a specific machine, perform the processing depicted in FIG. 2, including creating a hypergraph, receiving data object processing requests, calculating partition schemes, and reallocating workloads as needed.

Thus, in some embodiments, a processor-implemented method 211 that can be executed on one or more processors that perform the method may begin at block 221 with creating a hypergraph of vertices, including weighted vertices. The graph may include vertices of computing resources and storage resources, and nets comprising workloads.

The vertices may be weighted according to workloads assigned to them. Thus, individual ones of the vertices can be assigned weights that correspond to the workloads. The vertices may be weighted according to the amount of data they store. Thus, individual ones of the vertices may be assigned weights that correspond to the size of data to be stored using the storage resources.

The workloads may be characterized by the number and type of requests they generate, and the size of neighboring data objects. Thus, the workloads may each be associated with a net cost based on an expected number of the requests, the request types, and the size of neighboring data objects.

The workloads can be randomly assigned to the vertices, without any attempt to minimize communication overhead. Thus, the method 211 may continue on to block 225 with randomly assigning the workloads to the vertices of the nets prior to receiving the requests, without minimizing cross-location data communication overhead.

The method 211 may continue on to block 229 with receiving a plurality of requests (one or more of the received requests may be characterized by a request type) to be addressed by a network associated with the hypergraph. Any one or more of the requests may be associated with one or more data objects. In one embodiment of the method 211, as described previously, video files are requested, and distributed according to the ACO heuristic described herein. Thus, in this case, the requests are video file requests, and the request type may be used to define a type of video file format.

The method 211 may continue on to block 233 with calculating partition schemes for the network based on the requests and the data objects according to an ACO heuristic In some embodiments, capacity thresholds can be monitored, and when exceeded, used to activate operation of the ACO heuristic. Thus, the method 211 may continue on to block 237 with monitoring a threshold associated with exhausting at least one of the computing resources and/or storage resources, and when this occurs (e.g., perhaps by exceeding a threshold, as noted at block 241), move on to block 245 to activate the heuristic to reallocate the workload to prevent exhaustion (of the computing resources and/or the storage resources), responsive to the threshold being exceeded.

In some embodiments, the method 211 continues from block 233 to blocks 237 or block 245. If the monitored threshold is not exceed, the method 211 may continue from block 241 to block 229, to receive additional data processing requests. The method 211 may also continue from block 241 to block 245.

The activity at block 245 may comprise autonomously reallocating the workloads to the computing and/or storage resources according to the partition schemes, wherein the workloads act as ants following a path defined by the vertices of the hypergraph.

The workloads can be swapped between vertices, based on costs associated with the workloads. Thus, the activity at block 245 may comprise swapping two of the vertices between the workloads to reduce a metric based on internal costs and external costs associated with the workloads.

Swapping workloads may continue until the metric used to measure costs associated with the workloads has been reduced to some selected amount. Thus, the activity at block 245 may comprise refraining from the swapping when the metric reaches a value of zero, the metric comprising a sum of differences between external and internal costs associated with two of the vertices, less twice the cost of a possible hyperedge between the two vertices.

Workload movement can also be controlled according to weight constraints associated with the resources existing at the various vertices. Thus, the activity at block 245 may comprise controlling the movement of the workloads as ants according to a combination of weight constraints associated with the capacity of the computing resources and/or the capacity of the storage resources.

Previously deposited pheromones can be set to evaporate after the swapping occurs. Thus, the method 211 may continue on to block 249 with evaporating the pheromones after the swapping. In addition, new pheromones can be deposited. Thus, the method 211 may continue on to block 257 with depositing pheromones along hyperedges of the hypergraph, where the hyperedges are used for swapping the vertices between the workloads.

Pheromones can be deposited after a swap between vertices occurs. Thus, the depositing can occur after the swapping (as is shown in FIG. 2).

Workload movement can be controlled according to a probability function derived from the pheromone content of an edge, and its desirability (which may in turn be related to the measure of its distance). Therefore, the activity at block 257 may also comprise controlling the movement of the workloads as ants according to the amount of the pheromones that have been deposited, and not yet evaporated. The probability of movement of one of the workloads from one of the vertices to another of the vertices may depend on a product divided by a sum of products (e.g., see equation [1] described herein). One or more of the products may comprise the amount of pheromone on an edge of the hypergraph times a desirability of the edge.

The methods described herein do not have to be executed in the order described, or in any particular order. Moreover, various activities described with respect to the methods identified herein can be executed in repetitive, serial, or parallel fashion. The individual activities of the methods shown in FIG. 2 can also be combined with each other and/or substituted, one for another, in various ways. Information, including parameters, commands, operands, and other data, can be sent and received in the form of one or more carrier waves.

The methods of autonomous intelligent workload management shown in FIG. 2 can be implemented in various devices, as well as in a computer-readable storage medium, where the methods are executed by one or more processors. Further details of such embodiments will now be described.

Figure 3:
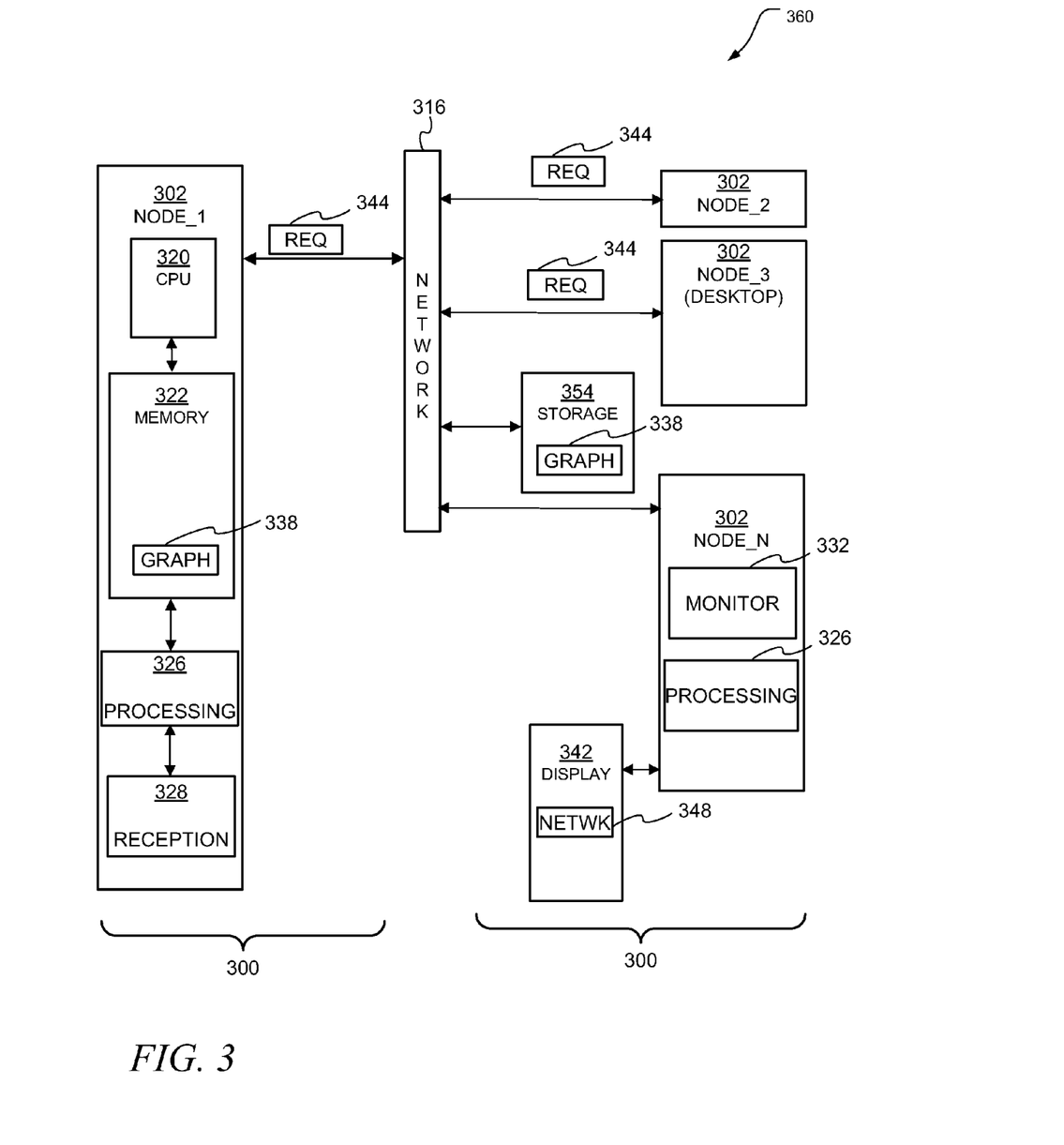
FIG. 3 is a block diagram of apparatus and systems according to various embodiments of the invention.

FIG. 3 is a block diagram of apparatus 300 and systems 360 according to various embodiments of the invention. Here it can be seen that an apparatus 300 used to implement autonomous intelligent workload management may comprise one or more processing nodes 302, one or more processors 320, memory 322, a processing module 326, and a reception module 328, as well as a monitoring module 332. One or more hypergraphs 338 may be included in the apparatus 300, perhaps stored in a memory 322 and/or a storage node 354.

In some embodiments, the apparatus 300 may comprise one or more displays 342. The apparatus 300 may comprise a server, a client, or some other networked processing node.

The processing nodes 302 may comprise physical machines or virtual machines, or a mixture of both. The nodes 302 may also comprise networked entities, such servers and/or clients. In some implementations, the operations described can occur entirely within a single node 302.

In some embodiments then, an apparatus 300 may comprise a node (e.g., NODE_1) that includes a reception module 328 to receive a plurality of requests 344 (perhaps having a request type) to be addressed by a network 348, with at least some of the requests 344 being associated with one or more data objects. The apparatus 300 may further include a processing module 326 to create a hypergraph 338 associated with the network 348, the hypergraph 338 including weighted vertices as described previously. The processing module 326 may be used to calculate partition schemes for the network 348 based on the requests 344 and the data objects according to an ACO heuristic, and to autonomously reallocate the workloads to the computing resources and the storage resources according to the partition schemes, wherein the workloads act as ants following a path defined by the vertices of the hypergraph 338.

In some embodiments, the apparatus 300 comprises a display 342 to display the network 348 and the vertices, and/or lists of their associated resources. The apparatus 300 may also comprise a storage node 354 to store the hypergraph(s) 338. Still further embodiments may be realized.

For example, it can be seen that a system 360 that operates to implement autonomous intelligent workload management may comprise multiple instances of the apparatus 300. The system 360 might also comprise a cluster of nodes 302, including physical and virtual nodes. It should be noted that any one of the nodes 302 may include any one or more of the elements explicitly shown in any other one of the nodes NODE_1, NODE_2, . . . , NODE_N.

In some embodiments then, a system 360 can operate using one or more nodes 302. That is, a system 360 may comprise a plurality of first nodes (e.g., NODE_1) each including a reception module 328 to receive a request 344 as described previously. The system 360 may further comprise one or more second nodes (e.g., NODE_N) comprising a processing module 326 to create one or more hypergraphs 338 associated with one or more networks, and conduct other processing associated with the hypergraph(s) 338 and an ACO heuristic, as described previously.

In some embodiments, the apparatus 300 or the system 360 that carries out the tasks may itself comprise the network 348. Thus, the network 348 associated with the hypergraph 338 may also be the network 316 that couples the plurality of first nodes 302 to one or more second nodes 302, for example.

A capacity monitor module 332 may be put in place to determine when the capacity of nodes 302 is about to be, or has been exceeded. Thus, the system 360 may comprise a capacity monitor module 332 to monitor capacity of the computing and/or storage resources designated by the vertices of the hypergraph 338.

The nodes 302 may exist as a device embedded within another structure (e.g., as an embedded device), or as a regular desktop or laptop computer that includes a display 342 to show the activities conducted while the node 302 is active. Thus, the system 360 may also comprise a display 342 coupled to the nodes 302 to display visible indications of the activities conducted at the nodes 302, including application information, policy information, resource allocation, and/or the network 348.

The apparatus 300 and system 360 may be implemented in a machine-accessible and readable medium that is operational over one or more networks 316. The networks 316 may be wired, wireless, or a combination of wired and wireless. The apparatus 300 and system 360 can be used to implement, among other things, the processing associated with the methods 211 of FIG. 2. Modules may comprise hardware, software, and firmware, or any combination of these. Additional embodiments may be realized.

Figure 4:
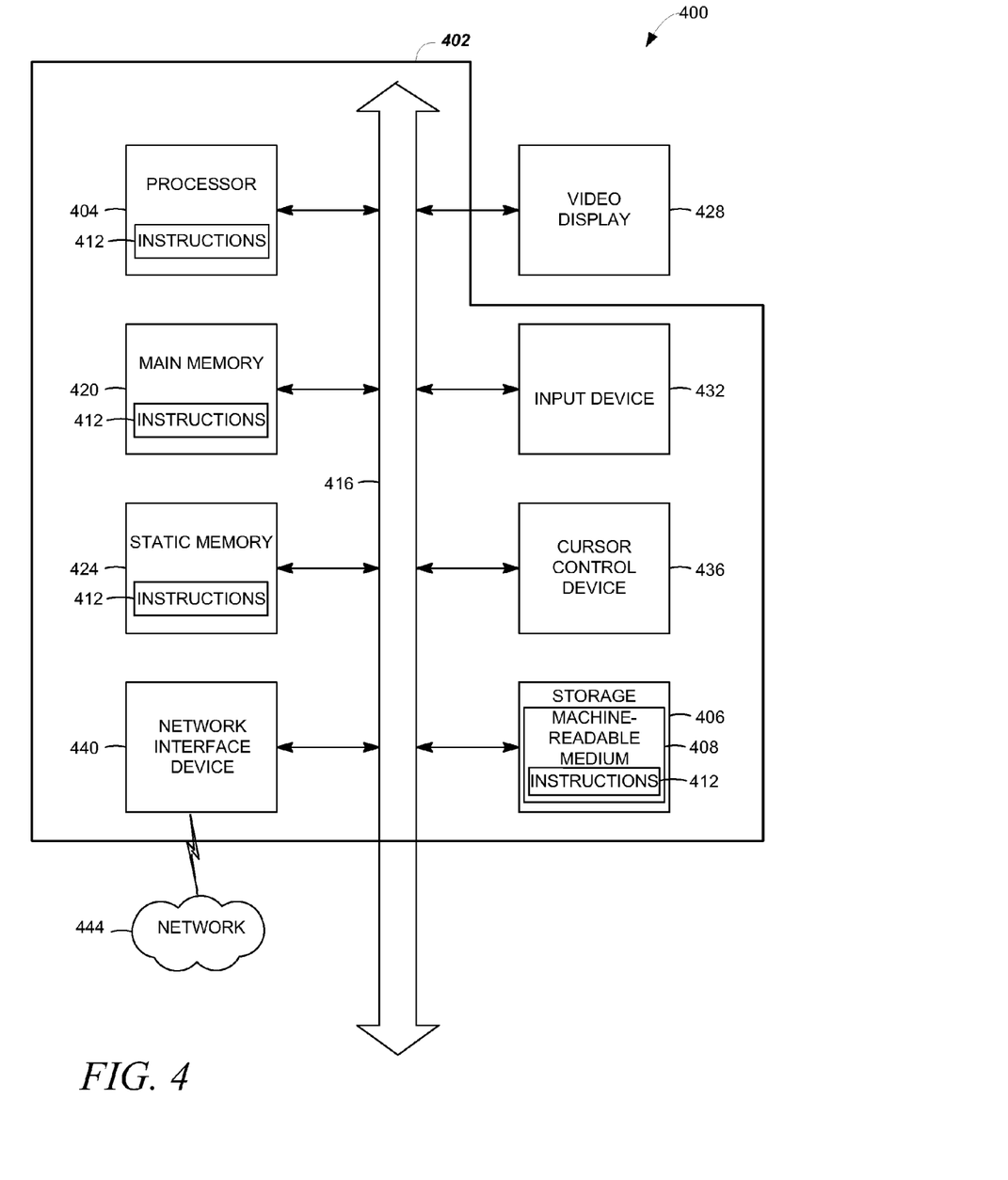
FIG. 4 is a block diagram of an article of manufacture, including a specific machine, according to various embodiments of the invention.

For example, FIG. 4 is a block diagram of an article 400 of manufacture, including a specific machine 402, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-oriented format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 400 of manufacture, such as a computer, a memory system, a magnetic or optical disk, some other storage device, and/or any type of electronic device or system may include one or more processors 404 coupled to a machine-readable medium 408 such as a memory (e.g., removable storage media, as well as any memory including an electrical, optical, or electromagnetic conductor) having instructions 412 stored thereon (e.g., computer program instructions), which when executed by the one or more processors 404 result in the machine 402 performing any of the actions described with respect to the methods above.

The machine 402 may take the form of a specific computer system having a processor 404 coupled to a number of components directly, and/or using a bus 416. Thus, the machine 402 may be similar to or identical to the apparatus 300 or system 360 shown in FIG. 3.

Turning now to FIG. 4, it can be seen that the components of the machine 402 may include main memory 420, static or non-volatile memory 424, and mass storage 406. Other components coupled to the processor 404 may include an input device 432, such as a keyboard, or a cursor control device 436, such as a mouse. An output device 428, such as a video display, may be located apart from the machine 402 (as shown), or made as an integral part of the machine 402.

A network interface device 440 to couple the processor 404 and other components to a network 444 may also be coupled to the bus 416. The instructions 412 may be transmitted or received over the network 444 via the network interface device 440 utilizing any one of a number of well-known transfer protocols (e.g., HyperText Transfer Protocol). Any of these elements coupled to the bus 416 may be absent, present singly, or present in plural numbers, depending on the specific embodiment to be realized.

The processor 404, the memories 420, 424, and the storage device 406 may each include instructions 412 which, when executed, cause the machine 402 to perform any one or more of the methods described herein. In some embodiments, the machine 402 operates as a standalone device or may be connected (e.g., networked) to other machines. In a networked environment, the machine 402 may operate in the capacity of a server or a client machine in server-client network environment, or as a peer machine in a peer-to-peer (or distributed) network environment.

The machine 402 may comprise a personal computer (PC), a tablet PC, a set-top box (STB), a PDA, a cellular telephone, a web appliance, a network router, switch or bridge, server, client, or any specific machine capable of executing a set of instructions (sequential or otherwise) that direct actions to be taken by that machine to implement the methods and functions described herein. Further, while only a single machine 402 is illustrated, the term "machine" shall also be taken to include any collection of machines that individually or jointly execute a set (or multiple sets) of instructions to perform any one or more of the methodologies discussed herein.

While the machine-readable medium 408 is shown as a single medium, the term "machine-readable medium" should be taken to include a single medium or multiple media (e.g., a centralized or distributed database, and/or associated caches and servers, and or a variety of storage media, such as the registers of the processor 404, memories 420, 424, and the storage device 406 that store the one or more sets of instructions 412. The term "machine-readable medium" shall also be taken to include any medium that is capable of storing, encoding or carrying a set of instructions for execution by the machine and that cause the machine 402 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Various embodiments may be implemented as a standalone application (e.g., without any network capabilities), a client-server application or a peer-to-peer (or distributed) application. Embodiments may also, for example, be deployed by Software-as-a-Service (SaaS), an Application Service Provider (ASP), or utility computing providers, in addition to being sold or licensed via traditional channels.

Implementing the apparatus, systems, and methods described herein may operate to manage requests for data processing by dynamically changing the allocation of workloads to resources in a self-determined fashion, while avoiding convergence to a locally-optimal solution. Thus, even when a workload is introduced that violates a resource constraint, perhaps due to momentary changes in resource availability, the algorithm can operate to move the workload to a location where the constraint is satisfied. Increased network operational efficiency, and user satisfaction may result.

This Detailed Description is illustrative, and not restrictive. Many other embodiments will be apparent to those of ordinary skill in the art upon reviewing this disclosure. The scope of embodiments should therefore be determined with reference to the appended claims, along with the full scope of equivalents to which such claims are entitled.

The Abstract of the Disclosure is provided to comply with 37 C.F.R. §1.72(b) and will allow the reader to quickly ascertain the nature of the technical disclosure. It is submitted with the understanding that it will not be used to interpret or limit the scope or meaning of the claims.

In this Detailed Description of various embodiments, a number of features are grouped together in a single embodiment for the purpose of streamlining the disclosure. This method of disclosure is not to be interpreted as an implication that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
a hardware reception module to receive a plurality of requests having a request type to be addressed by a network, at least some of the requests associated with data objects; and
a hardware processing module to:
create a hypergraph associated with the network, the hypergraph including weighted vertices comprising computing resources and storage resources, and nets comprising workloads represented as ants following a path defined by the vertices, the hypergraph including hyperedges used for swapping the vertices between the workloads to reduce a metric based on internal costs and external costs associated with the workloads;
calculate partition schemes for the network based on the requests and the data objects according to an ant colony optimization heuristic; and
autonomously reallocate the workloads to the computing resources and/or the storage resources according to the partition schemes by ant swapping, wherein to autonomously reallocate the workloads includes controlling movement of the workloads as the ants according to an amount of pheromones deposited along the hyperedges of the hypergraph, wherein the probability of movement of one of the workloads from one of the vertices to another of the vertices depends on a product divided by a sum of products, wherein the product comprises an amount of pheromone on an edge of the hypergraph times a desirability of the edge.

2. The apparatus of claim 1, further comprising:
a display to display the network and the vertices.

3. The apparatus of claim 1, further comprising:
a storage node to store the hypergraph.

4. The apparatus of claim 1, further comprising:
a capacity monitor module to monitor capacity of the computing resources and capacity of the storage resources.

5. A hardware processor-implemented method to execute on one or more processors that perform the method, comprising:
creating a hypergraph of weighted vertices comprising computing resources and storage resources, and nets comprising workloads;
receiving a plurality of requests having a request type to be addressed by a network associated with the hypergraph, at least some of the requests associated with data objects;
calculating partition schemes for the network based on the requests and the data objects according to an ant colony optimization heuristic, wherein the workloads act as ants following a path defined by the vertices of the hypergraph;
depositing pheromones along hyperedges of the hypergraph, the hyperedges used for swapping the vertices between the workloads to reduce a metric based on internal costs and external costs associated with the workloads; and
autonomously reallocating the workloads to the computing resources and/or the storage resources according to the partition schemes, wherein reallocating the workloads includes controlling movement of the workloads as the ants according to an amount of the pheromones, wherein the probability of movement of one of the workloads from one of the vertices to another of the vertices depends on a product divided by a sum of products, and wherein the product comprises an amount of pheromone on an edge of the hypergraph times a desirability of the edge.

6. The method of claim 5, wherein the depositing occurs after the swapping.

7. The method of claim 5, further comprising:
evaporating the pheromones after the swapping.

8. The method of claim 5, further comprising:
randomly assigning the workloads to the vertices of the nets prior to the receiving, without minimizing cross-location data communication overhead.

9. The method of claim 5, further comprising:
controlling the movement of the workloads as ants according to a combination of weight constraints associated with capacity of the computing resources and/or capacity of the storage resources.

10. The method of claim 5, wherein the requests are video file requests, and wherein the request type defines a type of video file format.

11. The method of claim 5, wherein individual ones of the vertices are assigned weights that correspond to the workloads.

12. The method of claim 5, wherein individual ones of the vertices are assigned weights that correspond to a size of data to be stored using the storage resources.

13. The method of claim 5, wherein the workloads are each associated with a net cost based on an expected number of the requests, the request types associated with the plurality of requests, and size of neighboring ones of the data objects.

14. The method of claim 5, further comprising:
- monitoring a threshold associated with exhausting at least one of the computing resources and/or the storage resources; and
- reallocate the workload to prevent exhaustion of the at least one of the computing resources and/or the storage resources, responsive to the threshold being exceeded.

15. A computer readable storage device including instructions that, when executed by a machine, cause the machine to perform operations comprising:
- creating a hypergraph of weighted vertices comprising computing resources and storage resources, and nets comprising workloads;
- receiving a plurality of requests having a request type to be addressed by a network associated with the hypergraph, at least some of the requests associated with data objects;
- calculating partition schemes for the network based on the requests and the data objects according to an ant colony optimization heuristic, wherein the workloads act as ants following a path defined by the vertices of the hypergraph;
- depositing pheromones along hyperedges of the hypergraph, the hyperedges used for swapping the vertices between the workloads to reduce a metric based on internal costs and external costs associated with the workloads; and
- autonomously reallocating the workloads to the computing resources and/or the storage resources according to the partition schemes, wherein reallocating the workloads includes controlling movement of the workloads as the ants according to an amount of the pheromones, wherein the probability of movement of one of the workloads from one of the vertices to another of the vertices depends on a product divided by a sum of products, and wherein the product comprises an amount of pheromone on an edge of the hypergraph times a desirability of the edge.

16. The computer readable storage device of claim 15, wherein the depositing occurs after the swapping.

17. The computer readable storage device of claim 15, further comprising:
- evaporating the pheromones after the swapping.

18. The computer readable storage device of claim 15, wherein individual ones of the vertices are assigned weights that correspond to a size of data to be stored using the storage resources.

19. The computer readable storage device of claim 15, wherein the workloads are each associated with a net cost based on an expected number of the requests, the request types associated with the plurality of requests, and size of neighboring ones of the data objects.

20. The computer readable storage device of claim 15, wherein the operations further include:
- monitoring a threshold associated with exhausting at least one of the computing resources and/or the storage resources; and
- reallocate the workload to prevent exhaustion of the at least one of the computing resources and/or the storage resources, responsive to the threshold being exceeded.

\* \* \* \* \*